United States Patent Office 3,474,117
Patented Oct. 21, 1969

3,474,117
MOLYBDENUM HEXACARBONYL-ACETYLENE REACTION PRODUCT
Robert J. Tedeschi, Whitehouse Station, and George L. Moore, South Plainfield, N.J., assignors to Air Reduction Company, Incorporated, New York, N.Y., a corporation of New York
No Drawing. Filed Dec. 19, 1967, Ser. No. 691,692
Int. Cl. C07f 11/00; C07d 107/00
U.S. Cl. 260—429                      2 Claims

ABSTRACT OF THE DISCLOSURE

A complex of molybdenum hexacarbonyl and acetylene is prepared by reacting molybdenum hexacarbonyl with liquefied acetylene. The complex is useful as a catalyst for the polymerization or cyclization of acetylene.

---

This invention relates to derivatives of acetylene and is more particularly concerned with a complex of acetylene and a metallic salt.

Complexes of acetylene with certain compounds have previously been reported. For example, a complex of acetylene and ammonia is described by Tedeschi and his co-workers in J. Org. Chem., 28, 1740 (1963) and J. Org. Chem., 30, 3045 (1965), the latter publication also referring to complexes of acetylene and certain alkali metal hydroxides. A diacetylene-N-methyl-pyrrolidinone complex has also been isolated by N. Shachat, J. Org. Chem., 27, 2928 (1962).

It is an object of this invention to provide a novel acetylene complex.

In accordance with the invention it has been discovered that when acetylene in liquefied form is reacted with molybdenum hexacarbonyl there is formed an acetylene-molybdenum hexacarbonyl complex or adduct of molybdenum hexacarbonyl (Mo(CO)$_6$) and acetylene with an apparent formula of $$Mo(CO)_6 \cdot CH{\equiv}CH$$

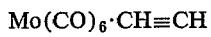

This compound is useful as a catalyst for the polymerization or cyclization of acetylene or substituted acetylenes, and when so used is suitably supported upon a carrier of the type used for other catalysts for such reactions, or it can be employed in homogeneous solution.

In forming the complex of this invention, the reaction between the liquefied acetylene and molybdenum hexacarbonyl is most advantageously carried out at a temperature of 15 to 50° C., preferably 20 to 35° C. The acetylene can be used in previously liquefied form, or gaseous acetylene can be liquefied in the reaction vessel itself by introducing the gaseous acetylene under pressure into the vessel at a low temperature so that the acetylene is cooled below its critical temperature.

The liquid acetylene used in accordance with this invention can be readily prepared by introducing compressed gaseous acetylene into a cooled vessel from a gas cylinder or other source. Ordinary cylinders of acetylene are at a pressure of about 250 p.s.i.g. when full. The acetylene can be used directly from the cylinder but preferably the pressure of the acetylene is increased to about 400 p.s.i.g. before the liquefaction step by introducing the acetylene into a pressure vessel or accumulator and pumping mineral oil into the bottom of the vessel until the desired acetylene pressure is obtained. As previously mentioned, the liquefaction of the acetylene is most readily effected in the autoclave or other vessel in which the reaction of the invention is to be carried out. Thus, the compressed gaseous acetylene is introduced into the reaction vessel which is suitably cooled to a sufficiently low temperature to cause liquefaction of the acetylene.

By using vapor pressure-temperature and density-temperature data such as found in V. J. Clancey, "Liquid and Solid Acetylene: A Review of Published Information" (England); Explosives Research and Development Establishment Survey 1/5/61, 1952, and in S. A. Miller, "Acetylene," Academic Press, pp. 506–516 (1965), the temperature needed for liquefaction of acetylene at a given acetylene pressure can be readily ascertained. In general, with an acetylene pressure of about 400 p.s.i.g., a temperature of −10 to −30° C. is sufficient to allow rapid liquefaction of the acetylene. Cooling of the reaction vessel, which is, of course, supplied with appropriate cooling coils or a cooling jacket, is readily achieved by means of any suitable cooling medium, and a particularly effective cooling medium is methanol which has been cooled by circulation through coils immersed in secondary butanol, or a mixture of ethylene glycol and methanol, containing pieces of solid carbon dioxide (Dry Ice). Heating of the reaction vessel is easily effected by circulating the methanol through a body of warm water.

In a preferred procedure, the molybdenum hexacarbonyl is first introduced into the reaction vessel, which is, of course, a pressure vessel, such as an autoclave adapted to withstand the pressures encountered. The autoclave is then sealed except for valved feed and exit lines. The liquefied acetylene is then added, most suitably, as mentioned, by directly liquefying it in the vessel which has been cooled to the appropriate temperature for liquefaction of the acetylene at the pressure under which the acetylene is introduced. Exit and feed valves are finally closed and the temperature raised to the desired reaction temperature. The time of reaction will vary, but ordinarily it will be complete within 2 to 6 hours. However, the above-mentioned reaction time is not limitative of the invention, and shorter or longer times may be employed as required.

The molybdenum hexacarbonyl and the acetylene are used in at least equimolar quantities, with an excess of acetylene preferred, and the molar ratio between the acetylene and molybdenum hexacarbonyl being most advantageously at least about 5:1, preferably at least about 8:1. Higher ratios can be used but generally there is no advantage in a ratio above 25:1.

The reaction zone is freed from air and dried before the reactants are introduced. This is suitably effected by sweeping the reaction zone with a dry inert gas, such as dry nitrogen. After the reaction is completed, excess acetylene is vented and the complex which has been formed is then removed.

As mentioned, the reaction is suitably carried out in any reaction vessel adapted to be operated under gauge pressure, such as an autoclave suitably jacketed for temperature control and provided with an agitator, and the components of the reaction mixture are introduced by the use of conventional supply means, such as cylinders or tanks. The amounts charged to the autoclave are advantageously determined by the use of conventional gauging or measuring devices.

The invention will now be further illustrated by reference to the following specific example, but it will be understood that the invention is not limited to this illustrative embodiment.

EXAMPLE

The apparatus employed was a 125 ml. stainless steel, high-pressure autoclave, which was equipped with an inner coil and jacket for heating and cooling and a suitable stirrer. The autoclave was dried by warming to about 50° C. and sweeping with N$_2$ prior to adding the molybdenum hexacarbonyl. Anhydrous molybdenum hexacarbonyl powder (13.2 g., 0.05 mole) was quickly introduced into the dry autoclave under a moderate current of dry nitrogen gas and the autoclave was then quickly sealed. Efficient cooling was effected by the use of a 2-3 gallon reservoir of ethylene glycol-methanol (1:1) in which a copper cooling coil was immersed. Copper lines from the coil exposed to the atmosphere and leading to the autoclave were insulated with fiber glass and vinyl tape. The methanol cooling liquid in the system was circulated by means of a pump. By continual introduction of small pieces of solid carbon dioxide into the reservoir a temperature of −40° to −60° C. was readily reached.

After cooling to about −40° C., acetylene was condensed in the autoclave (44 cc. of liquid, 0.90 mole).

A moderate exothermic effect was observed on liquefaction which is readily controlled by the circulating heat exchange fluid. After all the acetylene has been liquefied into the reactor, the autoclave stirrer was turned on and the reaction temperature cautiously raised to the 25–30° C. range. No pronounced or significant exothermic effect was observed on raising the temperature. The reaction mixture was stirred at 23–33° C. for a total of five hours. The reaction pressure during the five hour reaction varied between 620 and 725 p.s.i.g.

The autoclave stirrer was turned off. The autoclave vent line connecting to the vent stack draft was disconnected, and the autoclave vent valve was then very carefully and slowly opened to avoid a sudden pressure surge and the gas slowly vented through a calibrated gas meter at a rate of approximately 1 to 2 liters per minute. A total of 0.62 liter (0.025 mole) of acetylene reacted to form the complex out of a total of 24.0 liters (0.9 mole) introduced.

The autoclave was opened under a positive pressure of nitrogen and the product molybdenum hexacarbonyl-acetylene adduct or complex was removed. The product recovered was in the form of a granular solid of white color. Acetylene recovery data and calculations showed a 51% conversion calculated as a 1:1 $Mo(CO)_6$-$C_2H_2$ complex.

It will be understood that various changes and modifications can be made without departing from the invention as above described, and without departing from the invention as defined in the appended claims. It is intended, therefore, that all matter contained in the foregoing description shall be interpreted as illustrative only and not as limitative of the invention.

We claim:
1. The process of producing a complex of molybdenum hexacarbonyl and acetylene which comprises reacting molybdenum hexacarbonyl with liquefied acetylene.
2. A complex of acetylene and molybdenum hexacarbonyl.

References Cited

FOREIGN PATENTS 567,743   6/1958   Belgium.

TOBIAS E. LEVOW, Primary Examiner

A. P. DEMERS, Assistant Examiner

U.S. Cl. X.R.

252—431; 260—94.1, 673